Figure 1:
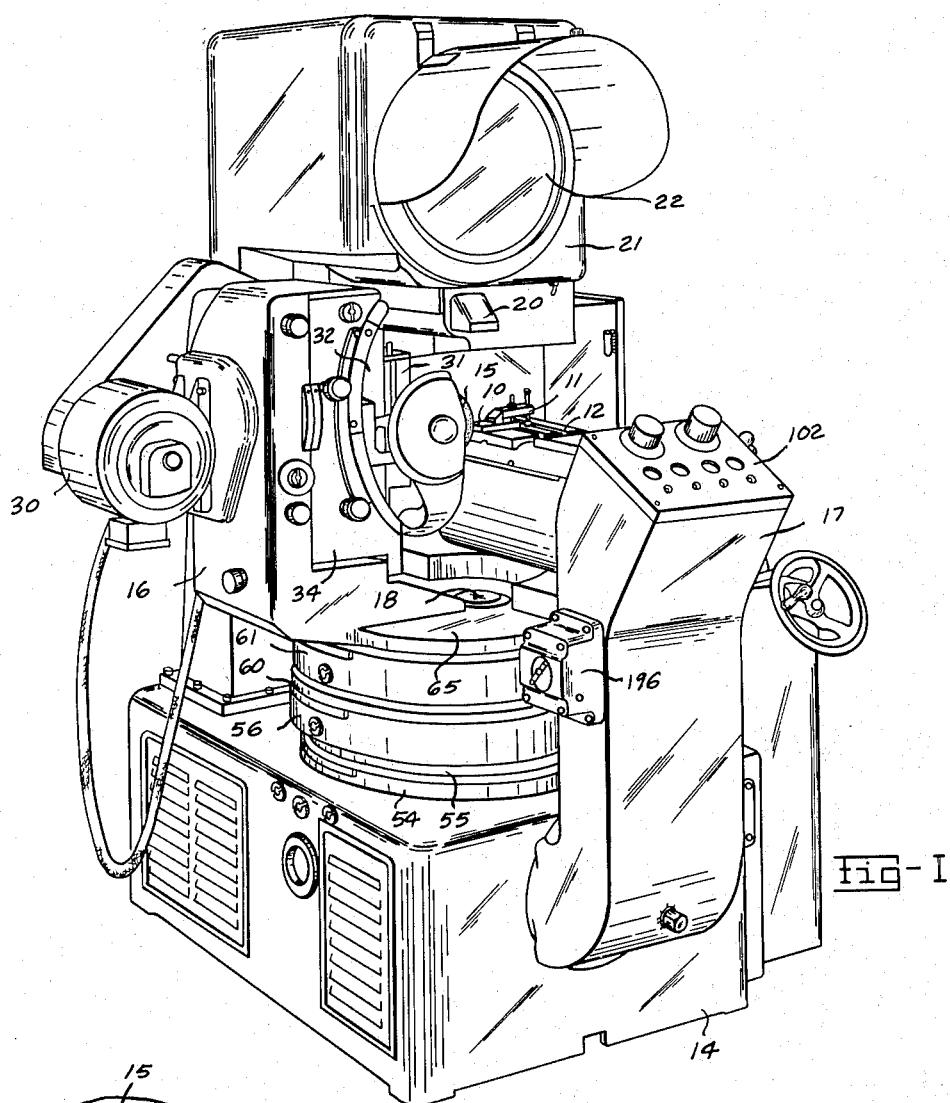

April 17, 1956     J. H. STRAW     2,741,882
MACHINE TOOL

Filed Feb. 4, 1954     6 Sheets-Sheet 1

INVENTOR.
Jesse H. Straw
BY Edward J. Noe Jr.

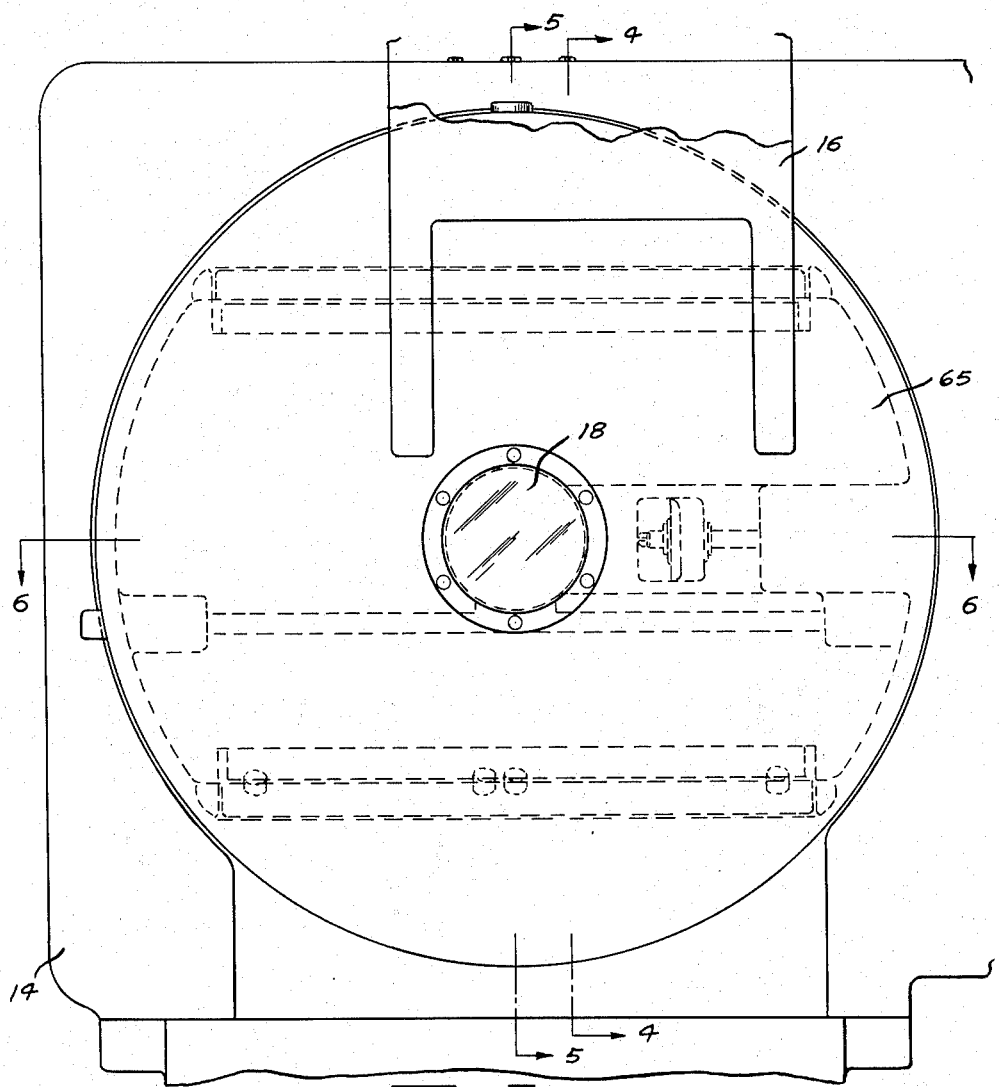
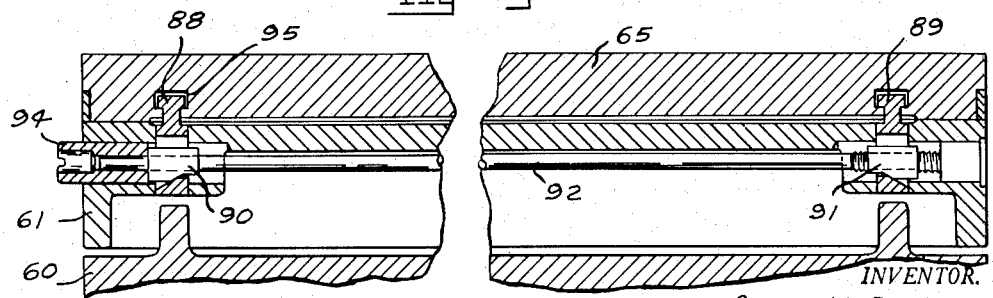

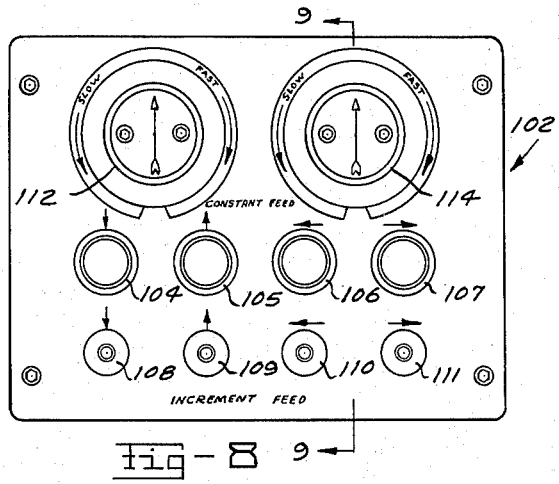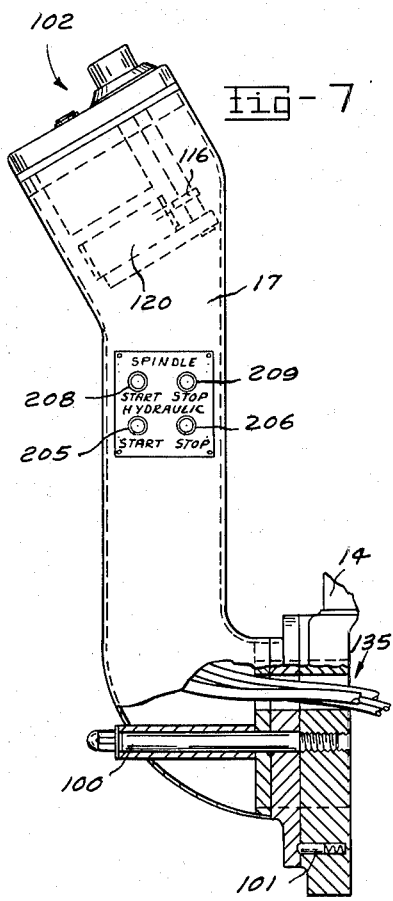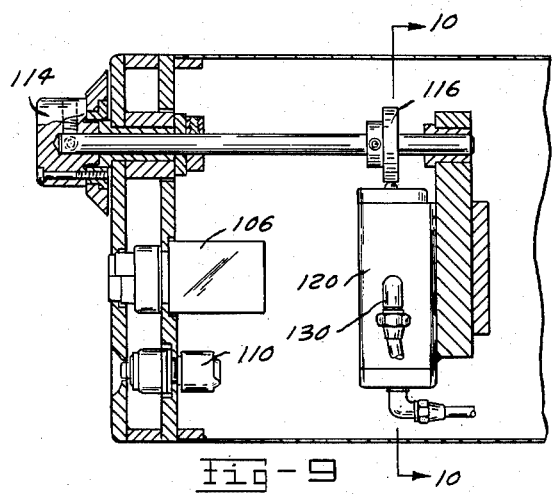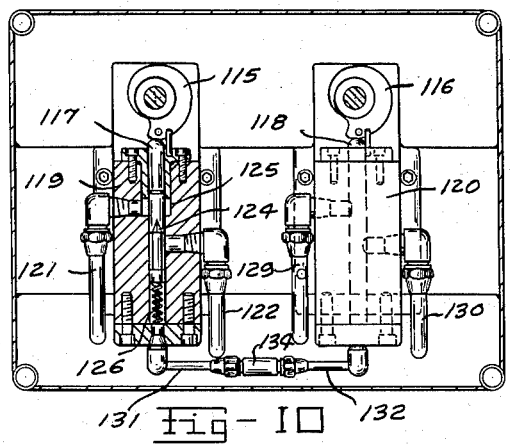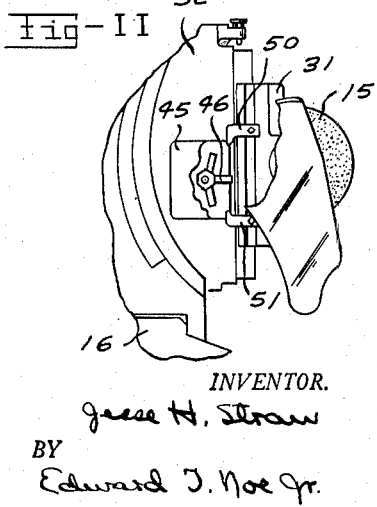

April 17, 1956 J. H. STRAW 2,741,882
MACHINE TOOL
Filed Feb. 4, 1954 6 Sheets-Sheet 5
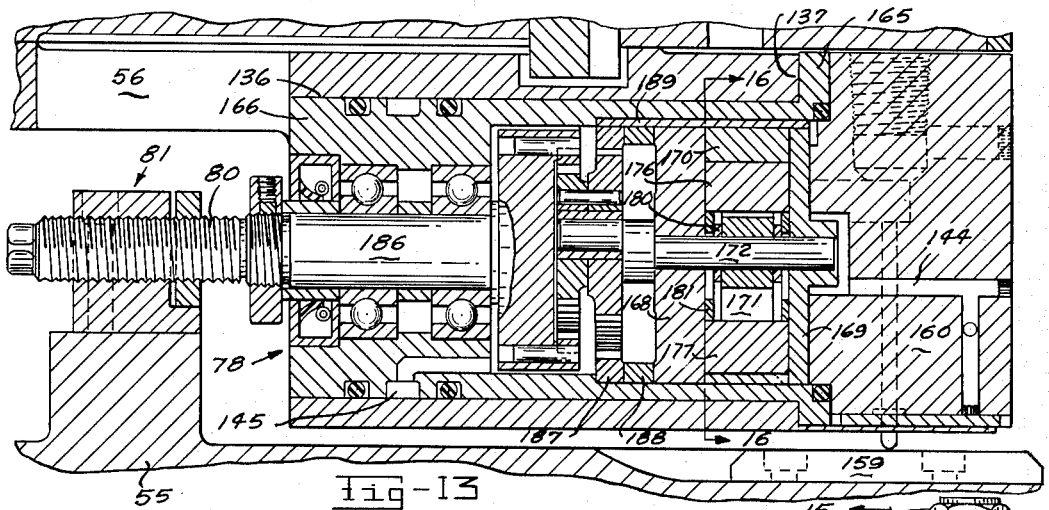
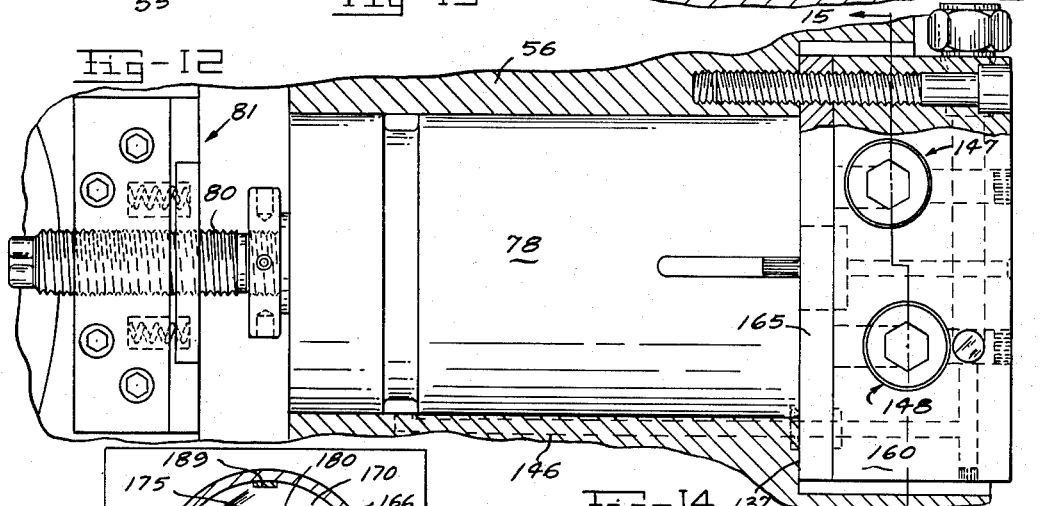
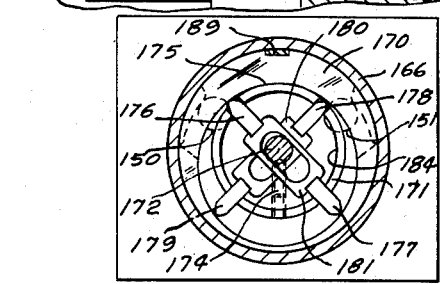
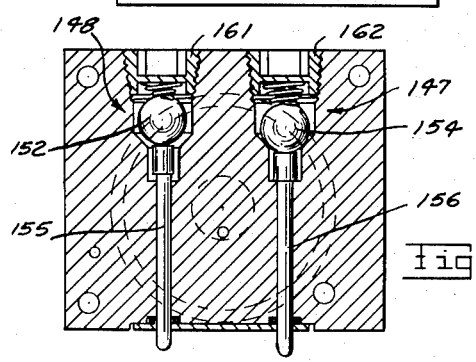
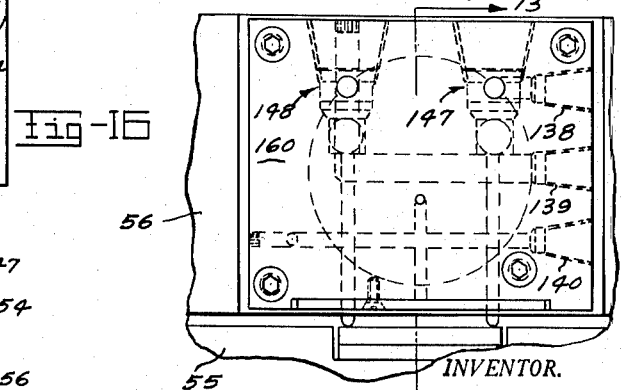
INVENTOR.
BY Jesse H. Straw
Edward J. Noe Jr.

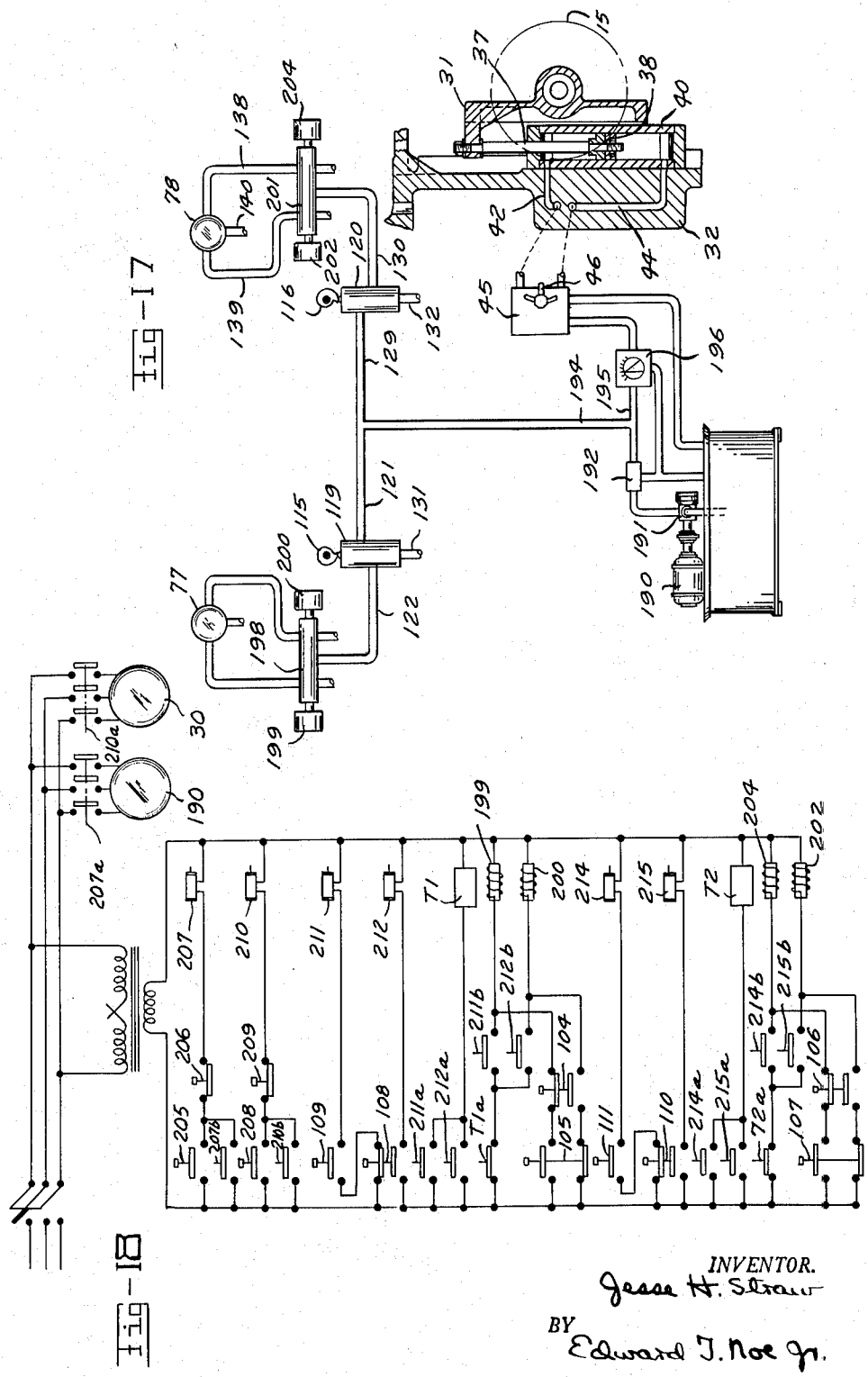

United States Patent Office 2,741,882
Patented Apr. 17, 1956

2,741,882
MACHINE TOOL

Jesse H. Straw, Brookville, Ohio, assignor to The Sheffield Corporation, Dayton, Ohio, a corporation of Ohio Application February 4, 1954, Serial No. 408,163

12 Claims. (Cl. 51—165)

This invention relates to a machine tool for precisely controlling tool movements in forming operations.

One object of this invention resides in the provision of a machine tool having a tool such as a grinding wheel or the like and an optical system giving a magnified view of the work and grinding wheel edge during grinding, and in which there is provision for very accurate adjustment of the tool in different directions along the work, the structure being so arranged as to be conveniently under control of the operator at all times for precise adjustment.

It is a further object to provide an adjustable tool support comprising a compound turntable and driven slide arrangement for use in conjunction with an optical projection system wherein the projection beam passes vertically upward along the axis of turntable adjustment and along the work and tool whereby no compensating adjustments are necessary upon rotation of the turntables.

It is a further object to provide a machine tool wherein the movements of a forming tool such as a grinding wheel are precisely controlled through a controlling system providing both a steady tool movement and a tool movement through cyclically repeated timed increments wherein the rate of movment during movement under either condition is also precisely controllable.

It is a further object to provide such a machine tool wherein the tool is selectively controlled for movement along two adjustable axes and wherein such controls are independently provided for the movement along each of the axes of movement, cooperating to provide precise tool control as desired.

It is a further object to provide a machine tool wherein tool movements are controlled from control means carried on a control pedestal mounted for swinging movements from a central position adjacent the work and tool whereby the controls can be conveniently located for operation during a forming operation and the pedestal can be swung aside for ready access to the machine components during set-up or the like.

It is a further object to provide a machine tool wherein a rotatable grinding wheel is hydraulically reciprocated in the plane of the grinding wheel during grinding, the reciprocations being precisely controlled as to both amplitude and rate.

It is a further object to provide a drive system for relative movement between machine tool components comprising a nut fixed to one component having a lead screw threaded therein and a rotatable fluid motor carried from another of the components and operatively connected to said lead screw for rotation thereof.

It is a further object to provide a fluid motor unit especially adapted for uses as referred to above wherein check valve means are provided which are automatically actuated to stop motor drive at predetermined limits of machine tool component movement.

Figure 2:
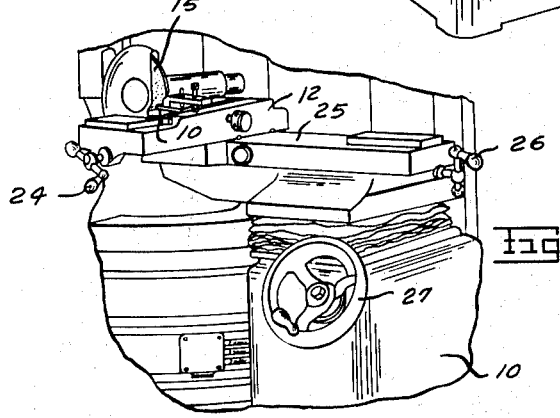
Figure 5:
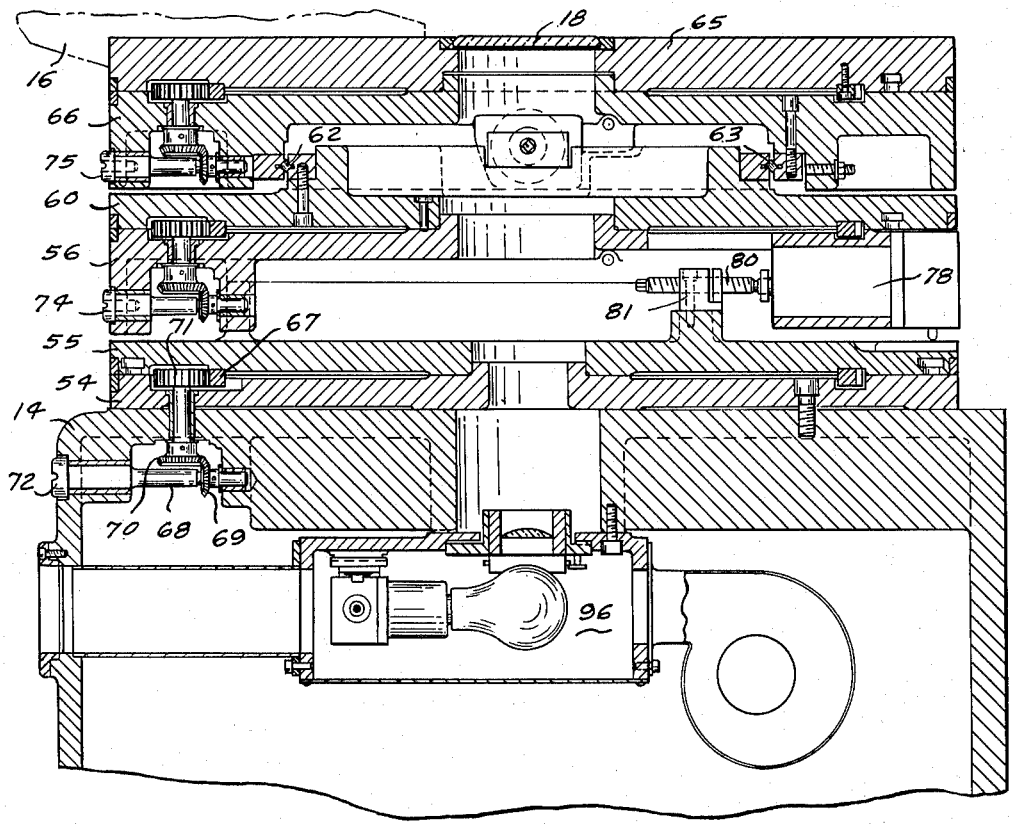
Figure 6:
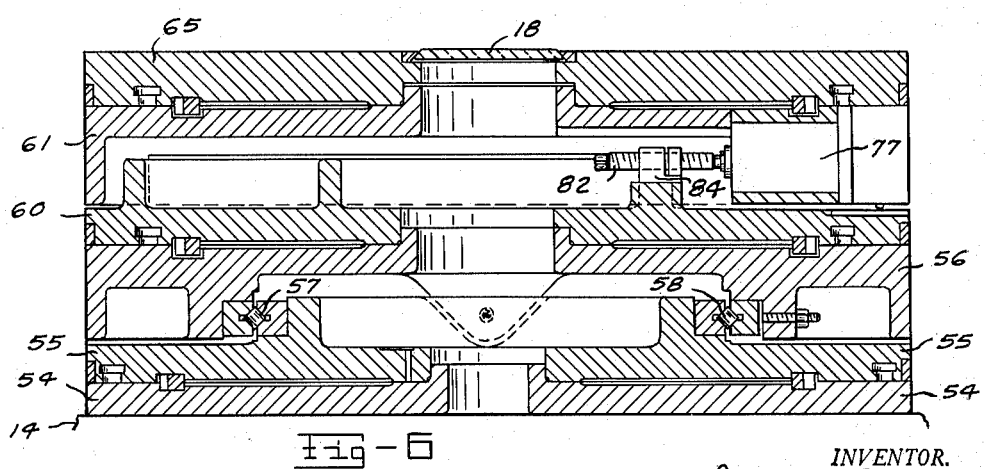

Other objects and advantages of the invention will be apparent from the following description, the appended claims and the accompanying drawings, in which, Figure 1 is a perspective view of an exemplary profile grinding machine including an optical projection system and embodying the features of the present invention, Figure 2 is a fragmentary perspective view disclosing the work support of the machine of Figure 1, Figure 3 is a plan view of the upper tool supporting table, Figure 4 is a fragmentary sectional view along line 4—4 of Figure 3 illustrating a turntable clamping structure, Figure 5 is a sectional view taken on line 5—5 of Figure 3 illustrating the tool holder supporting tables and slides, Figure 6 is a sectional view on line 6—6 of Figure 3, Figure 7 illustrates in partial central section the pedestal or tower which carries the controls for the illustrated machine tool, Figure 8 is a view of the control panel at the upper end of the pedestal of Figure 7, illustrating the controls for the tool movement, Figure 9 is a sectional view on line 9—9 of Figure 8 showing a knob for controlling the rate of tool movement, its association with a controllable valve unit and a pair of control switches, Figure 10 is a view on line 10—10 of Figure 9, Figure 11 is a fragmentary view in elevation of the grinding wheel reciprocating structure and control, Figure 12 is a plan view of a fluid motor used to obtain precise control of the tool holder supporting slides, shown with the supporting machine tool components in section, Figure 13 is a longitudinal central section of the fluid motor taken on line 13—13 of Figure 14.

Figure 14 illustrates the right hand end of the fluid motor as it appears in Figure 12, Figure 15 is a sectional view on line 15—15 of Figure 12 illustrating the hydraulic stop structure and its actuating plungers, Figure 16 is a sectional view on line 16—16 of Figure 13 and shows the interior construction of the rotatable vane motor drive, Figure 17 is a diagrammatic illustration of the hydraulic system embodied in the illustrated machine tool, and Figure 18 is a diagram of the electrical system involved in controlling the tool movements.

In the drawings, in which the same reference numerals are applied to like parts in the several views, is illustrated an exemplary machine embodying the features of this invention wherein a work forming tool is precisely controlled in a forming operation while in association with a workpiece carried from an adjustable work support. The work support and a tool holder are carried from the machine base, the tool holder being supported on an arrangement of rotatable turntables and driven slides. The line of sight of an optical system, shown here as comprising a projection screen, is along the axis of the turntable arrangement. Controls for precise movement of the tool holder supporting slides are conveniently placed on a swingable pedestal havng a central position adjacent the work support, tool holder and the projection screen. The tool in the illustrated example is a grinding wheel carried for reciprocating movements along a line perpendicular to its axis of rotation while being rotatably driven for grinding.

As illustrated the workpiece 10 is clamped by means indicated at 11 to a workpiece supporting table 12 carried for adjustment from the base 14 of the machine. The grinding wheel 15 is carried by a tool holder 16 which is mounted through a series of adjustable turntables and driven slides, also from the base 14. The controls for the driven grinding wheel supporting slides are mounted on a pedestal 17 swingably mounted for movement from side to side relative to the base 14 from a central position where the controls are adjacent the work 10 and the grinding wheel 15 and conveniently accessible to the operator. During a grinding operation a light beam projected through a glass disc 18 passes vertically and centrally through the turntable arrangement. The light is received at 20 and through a commercially available projection system enclosed in a cabinet 21 the edge of the workpiece and the cutting profile of the grinding wheel, when its reciprocations take it through the focal point at the workpiece edge, are projected upon a screen 22. Thus the operator while closely observing the relative positions of the grinding wheel 15 and the work 10 as projected upon the screen 22 can conveniently control the grinding wheel movement and the profile formed upon the workpiece 10 by means of the controls carried from pedestal 17.

The optical projection system comprises a suitable arrangement of lenses, prisms and reflectors such as, for example, that disclosed in Polk et al. Patent No. 2,614,-368, dated October 21, 1952. An additional source of light from above can also be provided.

As seen in Figure 2, the work supporting table 12 is adjustable generally along the axis of the grinding wheel by a crank 24 relative to a lower table 25 which is in turn adjustable toward and from the grinding wheel by means of a crank 26. Both the work supporting table 12 and the lower table 25 are carried for vertical adjustment from the base 14 of the machine. The vertical work table adjustment is by means of a crank 27 through actuating structure not illustrated.

The grinding wheel 15 is driven through a belt and pulley arrangement from a motor 30 also carried from the tool head 16. The grinding wheel shaft is rotatively mounted in a carrier 31 carried in ways for reciprocation along the face of a half moon segment 32 in the tool head 16. The half moon segment 32 is manually adjustable about an axis parallel to the axis of the grinding wheel shaft. The half moon segment 32 is in turn carried from a member 34 mounted for adjustable rotation to fixed positions about a horizontal axis perpendicular to the aforementioned axis about which the half moon segment 32 is adjustable. Thus the line along which the grinding wheel carrier 31 reciprocates can be adjusted to angles within the tool head 16 as desired for forming.

In Figure 17 is illustrated a vertical central section of the grinding wheel carrier 31 and the interior of the half moon segment 32. The carrier 31 is attached by means of a rod 37 to a piston 38 carried for reciprocation in a cylinder 40 mounted on segment 32. Hydraulic fluid is metered through one of conduits 42 and 44 and returned through the other in accordance with the direction in which piston 38 is to be moved. This metering is controlled by a pilot valve 45 which is actuated to reverse the fluid flow whenever its operating arm 46 is actuated in either direction. This valve unit is of a commercially available type. Referring to Figure 11 it will be seen that the valve unit 45 is mounted on the side of the half moon segment 32 with its operating arm 46 projecting into the path of adjustable contacts 50 and 51 fixed to the carrier 31. In accordance with the adjusted positions of contacts 50 and 51 along the length of carrier 31 the operating arm 46 is actuated at the extremities of reciprocations desired upon engagement of the arm 46 by either of these contacts. This gives a precise control of the amplitude of grinding wheel movement.

The turntable and slide structure which carries the tool holder 16 for movement in a grinding operation is disclosed in detail in the sectional views of Figures 5 and 6 which are taken in planes disposed 90 degrees with respect to one another through the structure as illustrated in Figure 3. The lower turntable 55 is carried for rotatable adjustment on a plate 54 fixed to the base 14. The turntable 55 carries a lower slide 56 for movement transversely thereof along roller-ways indicated at 57 and 58 in Figure 6. An upper turntable 60 is rotatably carried on the slide 56 and in turn carries upper slide 61 for movement along roller-ways 62 and 63. A tool holder supporting turntable 65 is carried for rotation on the upper slide 61. The rotatable turntables in combination with the adjustments of the tool holder 16 make it possible to form a diversity of shapes no matter how intricate, with the clearance angle being ground simultaneously with the form.

The lower turntable 55 has an internal gear 67 fixed to its lower surface. Turntable adjusting shaft 68 drives through bevel gears 69 and 70 to rotate a pinion 71 engaging the gear 67. Upon rotation of shaft 68 by means of adjustment 72 the turntable 55 can be positioned by rotation relative to the plate 54 as desired. Similar adjustments are provided at 74 and 75 to adjust the upper turntable 60 on the lower slide 56 and the tool supporting turntable 65 on the upper slide 61, respectively. The upper turntable 60 and the lower turntable 55 can be adjusted a maximum of 45 degrees to either side of zero as indicated on calibrated strips cooperating with vernier segments fixed to the machine components.

The slides 61 and 56 are moved along their respective turntables 60 and 55 by means of fluid drive motors indicated at 77 and 78. The fluid motor 78 is fixed to the lower slide 56 and serves to reversibly rotate a lead screw 80 threaded within a split nut 81 fixed to the upper surface of turntable 55. The fluid motor 77 is similarly carried from the upper slide and rotates a lead screw 82 threaded into a split nut 84 fixed to the upper turntable 60. Thus upon actuation of the fluid motors the slides will be moved transversely along their supporting turntables in directions as determined by the turntable positions.

The turntables are clamped in their rotated adjusted positions by structure such as that disclosed in Figure 4 for the tool holder turntable 65 and the upper slide 61. Holding clamps 88 and 89 engage an annular T-shaped groove 95 in the tool supporting turntable 65. These clamps 88 and 89 are biased downwardly by clamping blocks 90 and 91 which engage inclined surfaces on the clamps. When the blocks 90 and 91 are drawn together by rotation of the adjustment 94 and shaft 92 the clamps 88 and 89 are drawn downwardly clamping turntable 65 to the slide 61. Similar clamping arrangements are provided for the other turntables.

A light source is provided at 96 (see Figure 5) which projects a beam vertically through disc 18 and along the edge of the work and grinding wheel to the projection system 21. It will be noted that the axis of rotation of the lower turntable 55 coincides with the axis of the projected light beam. Because of this unique arrangement compensating adjustments are unnecessary as would be required if the axis of turntable adjustment were offset from the axis of the projected light beam. This makes it possible to provide slide range only for the necessary tool movements in forming without additional range being provided for compensation and materially simplifies the machine operation. Passages through all slides and turntables are provided for an uninterrupted beam of light under all adjusted conditions.

In Figures 7 to 10 the details of the control tower or pedestal 17 are illustrated. This pedestal 17 is rotatable about the axis of a shaft 100 threaded into the machine base 14. A spring urged plunger 101 fits into a depression at the lower end of the pedestal 17 to hold the pedestal in its central position. When so centrally located the controls carried by the pedestal 17 are conveniently located at the proper height for an operator viewing the relative movements of the grinding wheel and the work in a grinding operation as projected upon the screen 22. The swinging carriage of the pedestal 17 allows the pedestal to be positioned as convenient in a forming operation and also allows its swinging aside for ready access to the grinding wheel, the work, and to other machine components as necessary in set-up.

The primary controls for the movement of the tool in a forming operation are located on a feed control panel at the upper end of the pedestal 17 as indicated generally at 102 in Figure 7. These controls govern the direction of tool movement and the rate of tool movement in either steady or timed incremental movement along the slides as determined by the adjustment of the turntables previously described.

The upper slide is controlled by dials and push buttons on the left side of the feed control panel in its adjusted direction of movement generally along the edge of the work and the lower slide is controlled by similar controls at the right hand side of the panel for movements generally toward and from the work in accordance with its turntable adjustment. The various push button controlled switches of the control panel are situated in the electrical circuit of Figure 18 for the actuation of valve controlling solenoids to control the slide drive motors for constant feed or incremental feed in the general directions as are indicated by the arrows on the panel. The knobs at the upper portion of the panel served to adjust the rate of movement under any control condition by adjusting the hydraulic flow through associated valve units.

Push button actuated switches 104 and 105 control the movements of the upper slide in constant feed and switches 106 and 107 similarly control the movements of the lower slide. Switches 108 and 109 control the movements of the upper slide in the general directions as indicated by the arrows on the panel for increment feed and switches 110 and 111 serve to similarly control the lower slide. Flow controlling knobs 112 adjust the rate of the upper slide movement under either constant or incremental feed and knob 114 serves to control the flow in the hydraulic circuit to the motor 78 for the lower slide to adjust its rate of movement under either control condition.

Knobs 112 and 114 serve to rotate cams 115 and 116 respectively to adjust flow controlling plungers 117 and 118 in flow control valve units 119 and 120. The value unit 119 is shown in longitudinal central section in Figure 10. Hydraulic fluid under pressure supplied to the value unit 119 through a conduit 121 is led through the valve unit 119 to a conduit 122. The rate of fluid flow through the unit is determined by the register of a groove 124 on the plunger 117 with an angular groove 125 into which the conduit 121 leads. Plunger 117 is urged upward into engagement with its controlling cam 115 by a spring 126 carried in valve unit 119. For the valve unit 120 conduit 129 acts as a pressure supply and conduit 130 leads to the fluid drive motor 78 which this valve unit controls. The valve unit 120 has a construction identical to that of unit 119. Conduits 131 and 132 have a T connection at 134 and each serves to collect that fluid passing by the lower land of the respective plunger and return it to the hydraulic fluid supply tank. Both the electrical conduits and the various hydraulic conduits are led down through the pedestal 17 through and into the base 14 as indicated at 135 in Figure 7. These flexible connections allow control of the machine in all positions of the pedestal 17.

The hydraulic motors 77 and 78 which serve to actuate the upper and lower slides respectively are identical and a description of the unit 78 with particular reference to Figures 13 to 16 will suffice for both. In general from right to left as viewed in Figures 12 and 13 this fluid motor comprises a hydraulic stop structure, a rotatable vane type motor, a reduction gear unit, a drive shaft and a lead screw. The unit 78 is mounted by insertion into a cylindrical opening 136 below the lower slide 56 and at its right hand end abuts against the shoulder 137 of the slide and is screwed thereto.

There are three fluid couplings for the motor 78 indicated at 138, 139 and 140 in Figure 14. Couplings 138 and 139 are connected to conduits which are alternatively used for supply and return dependent upon the direction of rotation of the motor 78 and the movement of slide 56 along the ways of turntable 55. The coupling 140 is connected to a conduit for the drain of leakage fluid from the unit 78. Leakage fluid at the rear of the unit is led through a conduit or passage 144 and leakage fluid at the forward end of the unit is collected in an annular groove 145 which communicates with a passage 146. Both passages 144 and 146 lead to coupling 140 from whence such leakage fluid is returned to the hydraulic tank. The couplings 138 and 139 communicate through passages with openings at the upper end of check valve units 147 and 148 respectively. A passage leads from the lower portion of check valve unit 147 to an opening 150 in the rotor chamber of the fluid motor. Correspondingly the passage from the lower portion of check valve 148 leads to opening 151 of the rotor chamber. Flow controlling balls 152 and 154 are carried in the check valve chambers and are actuated by plungers 155 and 156 respectively. It will be noted that the plunger 155 is in a raised position in Figure 15 and when so situated the ball 152 is raised and either supply or return flow is possible through the check valve. Plunger 156 is illustrated in a lowered position wherein the ball 154 is against the seat of the check valve chamber and supply through the chamber to the fluid motor is stopped. However when the ball 154 is so situated return from the lower portion of the chamber and out of the upper portion thereof is possible against the resilient spring acting against ball 154.

It will be noted from Figure 14 that the check valve units 147 and 148 are offset from each other in the directions of movement of the lower slide 56 relative to the lower turntable 55. The plungers 155 and 156 are also so offset. The lower ends of the plungers controlling the check valves 147 and 148 slide along the upper surface of a cam plate 159 fixed to the lower turntable 55. As they slide along the upper raised surface of the plate 159 both plungers are raised and both supply and return is possible through either check valve. However, as the motor approaches either end of the plate 155 the advance plunger, which is associated with the supply conduit for movement in that direction, will drop off the beveled end of the plate and stop fluid supply, thus also stopping the relative movement between the lower slide 56 and the lower turntable 55. It will be noted that while the advance plunger has dropped making it impossible to supply further hydraulic fluid for movement in that direction the other plunger will remain raised thus making it possible to supply fluid for reverse sliding while fluid is returned through the closed check valve against the resilient bias until its plunger is raised. Thus an effective hydraulic stop is provided to prevent jamming of the lead screw 80 and the lead nut 81 and excessive movements in either direction.

The various passages are formed in an integral block 160 with the valve components inserted therein from one side thereof and retained in the block by threaded plugs 161 and 162. This valve block 160 abuts a flange 165 on motor body 166 which has a cylindrical portion inserted into the hole 136 in the lower slide 56. Screws passing through the outer edges of the valve block 160 and the flange 165 are threaded into the slide 56 and retain the motor in position.

The motor chamber is formed by two side plates 168 and 169 whose inner faces contact a ring 170 having an eccentric inner surface forming the peripheral chamber wall. A cylindrical rotor 171 is fixed to shaft 172 by set screw 174. Shaft 172 is journaled in the side plates 168 and 169. The rotor 171 is tangent to the inner wall of the motor chamber ring 170 at one point therealong as indicated at 175 in Figure 16. Diametrically opposed pairs of vanes 176 and 177, 178 and 179 are carried for radial sliding while in engagement with the peripheral chamber wall in radial slots formed in the rotor 171. Diametrically opposed pairs of vanes are spaced apart by spacer elements indicated at 180 for the pair of vanes 178 and 179 and at 181 for the pair of vanes 176 and 177. There is a pair of these spacer elements between each pair of diametral vanes, one element at each side of the rotor. As seen in Figure 16 the spacers 180 and 181 are placed one above the other and are slidably carried for diametral movement relative to the shaft 172. The spacer elements at each side of the rotor are disposed in depressions in the rotor side walls as indicated at 184 for the spacer elements viewed in Figure 16. The transverse dimension of the peripheral or outer wall of the motor chamber along a line passing through the axis of rotation of the shaft 172 is constant in all directions and the spacer elements maintain opposed pairs of vanes rigidly spaced apart and in engagement with opposite points on the chamber wall throughout the vane rotation; the vanes sliding along diameters of the rotor 171 as they rotate.

The shaft 172 is connected through an epicyclic gear reduction train to an output shaft 186 which in turn drives the lead screw 80 within the split lead nut 81 for sliding movement of the lower side 56 relative to the turntable 55.

It will be noted that the fixed internal gear 187 of the reduction gear train, a spacer 188, the two end plates and the ring 170 for the fluid motor chamber are all held against rotation with respect to the motor body 166 by a key 189. The lefthand face of the internal gear 187 abuts the lefthand end of an enlarged cylindrical portion in the body 166 with the other elements stacked therealong and maintained in position by the engagement of the valve block 160 therewith. Thus all the internal components of the fluid motor are easily assembled and maintained in their positions during operation.

Figure 17 illustrates diagrammatically the hydraulic system by which the fluid motors 77 and 78 and the grinding wheel carrier 31 are controlled and actuated. An electric motor 190 drives a hydraulic pump 191 supplying fluid to the system through an adjustable relief 192. Conduits 194 and 195 respectively lead to the slide drive motor controls and to the controls for the grinding wheel carrier actuation.

The rate of reciprocation of the grinding wheel carrier 31 on the half moon segment 32 is controlled by a flow control valve 196 mounted on the lefthand side of pedestal 17 as shown in Figure 1. As previously described the amplitude of reciprocation of the grinding wheel is controlled by the contacts mounted on carrier 31 and their relationship with the arm 46 of pilot valve 45.

The flow of fluid under pressure from conduits 121 and 129 to the fluid motors 77 and 78 is controlled by the valve units 119 and 120 respectively, previously described in relation to the pedestal 17. Adjustments of these valve units control the rate of rotation of the respective fluid motors and the rate of movement of the tool holder carrying slides along their adjusted directions. From valve unit 119 controlled fluid flows through conduit 122 to a valve unit 198 controlled by solenoids 199 and 200. When solenoid 200 is energized the valve 198 is actuated to rotate the motor 77 in one direction and when solenoid 199 is energized the motor 77 is rotated in the reverse direction. These solenoids are energized through the circuit of Figure 18 for steady or increment feed by the manually actuated electrical switches carried in the control panel 102. Similarly the valve unit 201 is controlled by solenoids 202 and 204 to drive the fluid motor 78 steadily or in increments in forward or reverse directions. The solenoids which control the valve units 198 and 201 are situated in the electrical circuit of Figure 18.

To set the machine into operation first the grinding wheel driving motor 30 and the hydraulic pump motor 190 must be started. Depression of hydraulic motor start switch 205 completes a circuit through stop switch 206 to relay 207. Relay 207 in turn closes switches 207a and 207b starting hydraulic pump motor 190 and closing a holding circuit around start switch 205 which returns to its open position where it is released. To stop the hydraulic pump motor 190 stop switch 206 is depressed to deenergize relay 207. In a similar manner grinding wheel spindle motor 30 is stopped and started. Switch 208 is the start switch for the grinding wheel motor 30 and when depressed completes a circuit through stop switch 209 to relay 210 which in turn closes switch 210a and switch 210b, starting motor 30 and completing a holding circuit around start switch 208. These stop and start switches are carried at one side of pedestal 17 (see Figure 7).

Switches 104 and 105 are the constant feed control switches for the movement of the tool holder 16 generally away from and toward the operator. These tool holder movements correspond to a movement of the projected image of the grinding wheel 15 along the projection screen 22 upward and downward. Of course this movement varies in accordance with the adjusted positions of the turntables. Switch 105 when depressed completes a circuit through the upper contact of switch 104 to solenoid 199 which actuates the valve spindle within valve unit 198 for a constant rotation of the fluid motor 77 in one direction and a movement of the tool holder away from the operator. Manually actuated switch 104 when depressed completes a circuit through the lower contact of switch 105 to solenoid 200 controlling valve unit 198 to drive fluid motor 77 in the reverse direction and to traverse the tool holder generally toward the operator. It will be noted that switches 104 and 105 are so interrelated that actuation of one disables the other.

Switch 109 is depressed when it is desired to move the projected image of the grinding wheel generally upward on the projection screen in increment feed. Depression of this switch energizes relay 211 closing switches 211a and 211b. Switch 211a energizes a timer unit T1. This unit is of a commercially available type and can be adjusted to cyclically open and close switch T1a in repeated timed increments in accordance with its adjustment. As switch T1a is opened and closed by timer T1 it completes and breaks a circuit through closed switch 211b to solenoid 199 giving an increment control of fluid flow to the fluid motor 77 and an incremental movement of the tool holder 16. Incremental control switch 108 is depressed when it is desired to move the projected image of the grinding wheel downward on the projection screen in incremental steps. Depression of this switch opens a circuit to relay 211 and closes the circuit to relay 212 energizing switches 212a and 212b. Switch 212a completes a circuit to the timer T1 referred to above which in turn cyclically opens and closes the switch T1a making and breaking a circuit through closed switch 212b to solenoid 200 for incremental control of the grinding wheel movements generally toward the operator.

The movements of the tool holder 16 and grinding wheel 15 generally to the right and left are controlled by the switches, relays and solenoids at the lower portion of the diagram of Figure 18. Switch 107 is depressed for movement of the tool holder 16 to the right and completes a circuit through the upper contact of switch 106 to solenoid 204 holding the valve 201 open for steady rotation of fluid motor 78 in one direction and the movement of the tool holder 16 to the right. When switch 106 is depressed it completes a circuit through the lower contact of switch 107 and to solenoid 202 for constant movement in a reverse direction. It will be noted that this switch arrangement is also arranged so that the actuation of one switch disables the other. Depression of switch 111 gives an incremental movement to the right, energizing relay 214 and closing switches 214a and 214b. This energizes timer unit T2 to cyclically open and close switch T2a giving a cyclic energization of solenoid 204 for increment feed of the tool holder 16 to the right. Similarly, depression of switch 110 energizes relay 215, closing switches 215a and 215b for cyclic movement to the left.

It will be appreciated that with a steady control of the tool movement and a control of the tool movement through adjustably timed increments combined with a rate control of the tool movement under either condition an extremely fine tool movement has been provided making it possible to control the tool movement precisely for high precision grinding operations. These controls have been provided in systems which are simple, rugged and reliable. The controls for the tool movement are conveniently grouped on the control panel situated upon a swingable pedestal which provides a positioning of the controls by the operator at his convenience in a grinding operation and permits swinging of the controls to one side or the other for convenient accessibility to machine components during setup or the like. Through the unique combination of turntables and slides combined with adjustments of the axis of reciprocation of the grinding wheel within the tool holder the machine of this invention is adapted for the efficient grinding of unique configurations. By rotating the turntable slide arrangement about the axis of the projected light beam, adjustments are simply made without complicated compensating movements and shorter slides are made possible. The plunger-check valve arrangement utilized in the fluid motor control will positively stop sliding movements and prevent over running of slide components and jamming of the screw drive in a structure which is basically simple and reliable. The fluid energy device utilized to translate the grinding wheel in its forming movements comprises a few components simply and compactly arranged and easy to assemble.

While the form of apparatus herein described constitutes a preferred embodiment of the invention it is to be understood that the invention is not limited to this precise form of apparatus, and that changes may be made therein without departing from the scope of the invention which is defined in the appended claims.

What is claimed is:

1. In a machine tool, a base, a work support, a tool support carried from said base, said tool support comprising a compound arrangement of turntables and slides, means mounting the turntables for rotatable adjustment and means mounting the slides from the turntables for movement transverse the turntables, a light source in said base comprising means for projecting a vertical beam of light, the turntables and slides having passages passing vertically therethrough for uninterrupted passage of said light beam, the axis of rotation of the lowermost turntable being concentric with the central axis of the beam, an optical projection system carried immediately above the tool and work supports for receiving and projecting the silhouette of portions of the tool and work during a forming operation, and drive means for actuation of the slides along the turntables.

2. In a machine tool, a base, a work support carried from said base, a tool supporting table, a series of turntables between said tool supporting table and said base, means carrying said turntables for relative adjustable rotation to fixed positions, supporting slides carried by said turntables whereby said tool supporting table is movable relative to the work support in directions as determined by the fixed rotative positions of the turntables, a light source in said base for projecting a vertical beam of light along the edges of the tool and work, said turntables and slides having vertical passages therethrough allowing the uninterrupted passage of said light beam, the axis of rotation of the lowermost turntable coinciding with the central axis of the light beam, an optical projection system comprising a receiver and a screen disposed immediately above the work and tool supports, drive means cooperating between each turntable and its respective slide for driving the tool supporting table along the adjusted turntable directions, control means operatively connected to said drive means for independent control of said tool supporting table along each of its adjusted directions to control the tool movement in work forming operations.

3. In a machine tool, a base, a work support, means adjustably carrying said work support from said base, a tool supporting table, means carrying said tool supporting table from said base for movements relative to the work support in a forming operation, said carrying means including controllable drive means for moving the tool relative to the work along two angularly disposed directions, means to adjust the directions of tool movement, a control pedestal carried from said base, means mounting said control pedestal for swinging movements from a central position adjacent the work support and tool supporting table to either side, control means included in said control pedestal and operatively connected to said drive means for control thereof in a work forming operation.

4. In a machine tool, a base, a work support carried from said base, a tool supporting table, means carrying said tool supporting table from said base for movement relative to the work support and including drive means, a control pedestal carried from said base including means operatively connected to said drive means for control thereof in a work forming operation, the control pedestal being normally positioned vertically, manually operable controls at the upper end of said pedestal and situated adjacent to said work support and tool supporting table in the normal position of said pedestal, a shaft supporting said control pedestal from said base, the control pedestal being pivoted about said shaft for swinging movements from its normal position whereby the controls can be positioned as desired and the work support and tool supporting table are readily accessible.

5. In a machine tool, a base, a work support, a tool support, means carrying said supports from said base including means carrying one support for movement relative to the other support and further including drive means for such movement, controls carried from said base operatively connected to said drive means, said control means comprising a first manually operable control for steady progressive movements of said one support relative to the other in selective reverse directions, and a second manually operable control for selective progressive movements in timed incremental steps, said second control means including means for adjustably controlling the duration of each incremental step, and further adjustable means to control the rate of movement during movement under actuation of either the first or second control means.

6. In a machine tool, a base, a work support carried from said base, a tool supporting table, means carrying said tool supporting table from said base for movement relative to said work support along an adjusted direction, said carrying means including a fluid drive motor operatively connected to drive said tool supporting table relative to said base in reverse directions along its adjusted direction, control means operatively connected to said fluid drive motor for control of the direction of drive of the motor and the direction of movement of the tool supporting table, said control means comprising a controllable valve means, a first manually adjustable means to control said valve means for a steady progressive movement of the tool supporting table, a second manually adjustable means for cyclically operating the controllable valve means for incremental movement of the tool supporting table relative to the work support, and further controllable valve means in the operative connection to the fluid motor to control the rate of fluid flow to said motor during its drive under control of either the first or second control means.

7. In a machine tool, a base, a work support, a tool support carried from said base, said tool support comprising a turntable carried from said base for rotation about a vertical axis and a slide carried for movement transverse said turntable, an optical projection system including a projection screen mounted above said work and tool supports, a light source in said base projecting a beam of light vertically and along the axis of rotation of said turntable, said tool support having passages therethrough allowing uninterrupted projection of the beam, drive means cooperating between said turntable and said slide, manually actuated control means operatively connected to said drive means, a pedestal carrying said control means, means supporting said pedestal from said base in a central position locating the control means adjacent the work and tool supports and the projection screen and for swinging movements to either side for ready access to machine components.

8. In a machine tool, a base, a work support, a tool support, said tool support including drive means for moving a tool in adjusted directions in a forming operation, an optical projection system including a screen carried adjacent said tool and work supports, manually actuated control means operatively connected to said drive means including a first manually actuated control means for steady progressive movements of said tool support, a second manually actuated control means for progressive movements of said tool support in repeated timed incremental steps and a further control means to adjust the rate of movement during movement under actuation of either the first or second control means, a pedestal swingably mounted from said base supporting said control means at its upper end and carrying said controls adjacent and in front of said projection screen when the pedestal is located in a predetermined position.

9. Means to cause relative movement between two machine tool components carried for relative movement comprising a nut means fixed to a first of the components, a screw threaded within said nut means, a reversibly driven fluid motor comprising a casing and a rotor, means fixing said casing to a second of the components, means operatively connecting said rotor to said screw for rotation thereof to cause relative motion between the components along the axis of the screw, hydraulic conduits connected to said fluid motor, a check valve in each of said conduits carried from said first component and including actuating plungers directed toward the first component and relatively spaced in the direction of relative movement between the machine tool components, and a cam plate carried from the first component for engagement with said plungers and cooperating therewith to limit the relative movement between the machine tool components by releasing the check valve associated with the supply conduit for movement in the respective direction and stopping fluid supply therethrough.

10. Means to cause relative movement between two machine tool components comprising, a reversibly driven fluid motor fixed to a first of the components and operatively connected to a second of the components to cause relative motion between the components along a given axis, a pair of conduits connected to said fluid motor alternatively acting as supply and return during motor drive in reverse directions, a pair of check valve means carried from said first component, one situated in each of said conduits, each of said check valve means including an operating plunger operative upon outward movement to release its associated check valve and stop supply flow through the corresponding conduit, means carrying said plungers from said first component for sliding movement transverse the axis of relative movement between the components and toward and from the second component, the plungers being relatively spaced along the direction of relative movement, the plunger in direction of movement being associated with the supply conduit for movement in that direction, a cam plate fixed to the second of said components and situated for engagement by the outward ends of said plungers, the central portion of said cam surface being raised and maintaining the plungers in inward positions and the ends of the plate being inclined transverse the direction of movement whereby the operating plunger in the direction of relative movement between the components will move outwardly upon reaching the end of the cam plate thus releasing its associated check valve and stopping fluid supply from movement in that direction.

11. In a machine tool, a base, a work support, a tool support carried from said base, said tool support comprising a turntable carried from said base for rotation about a vertical axis and a slide supported upon said turntable for movement transverse thereof, drive means connected between said turntable and said slide, said drive means comprising a lead nut fixed to said turntable, a screw threaded within said lead nut, a reversibly driven rotatable fluid motor carried from said slide and operatively connected to said screw for rotation thereof to cause relative movement between said slide and turntable, hydraulic conduits connected to said fluid motor, hydraulic stop means situated in said hydraulic conduits and comprising actuating plungers cooperating between said slide and said turntable to limit the relative movements therebetween, control means operative in said fluid conduits for control of said fluid motor, said control means including a first manually actuated control means for steady progressive movements of said tool support through steady rotation of said drive motor, a second manually actuated control means for incremental rotation of said fluid motor and for progressive movements between said slide and turntable in repeated timed incremental steps, and a flow control valve for adjusting the rate of fluid flow through said drive motor and the rate of movement during movement under actuation of either the first or second control means, and a support for said control means carried from said base adjacent the tool and work supports.

12. In a machine tool, a base, a work support, a tool head, a tool head support, said tool head support comprising a turntable and a slide carried for movement transverse the turntable, fluid motor drive means cooperating between the turntable and slide for moving the tool head in a forming operation, an optical projection system including a projection screen mounted adjacent and above said work support and tool head, a light source in said base projecting a beam of light vertically and along the axis of rotation of said turntable, a grinding wheel, drive means operatively connected to said grinding wheel for rotation thereof in a grinding operation, a carrier supporting said grinding wheel from said tool head for reciprocating movement along a line perpendicular to the axis of the grinding wheel, fluid motor drive means cooperating between said tool head and said grinding wheel carrier for actuation of said carrier in its reciprocating movements, hydraulic valve means operatively connected to said fluid motor drive for the grinding wheel carrier including means cooperating between the tool head and carrier for actuation of the valve means and reversal of carrier movement at adjusted limits of travel, manually adjustable control means operatively connected to said fluid drive motor for the tool head support, said manually adjustable control means including a first control means for steady rotation of said fluid motor and a steady movement of said tool head support, a second control means for incremental rotation of said tool head support fluid motor drive for progressive movements of said tool head support in repeated timed, incremental steps, a pedestal swingably mounted from said base supporting said tool head support control means at its upper end and carrying said controls adjacent and in front of said work support, said tool head and said projection screen when the pedestal is located in a predetermined position, further control means carried by said pedestal operatively connected to the fluid motor drive for the grinding wheel carrier reciprocation for adjustment of the rate thereof within the predetermined adjusted limits of movement.

References Cited in the file of this patent

UNITED STATES PATENTS

| Number | Name | Date |
|---|---|---|
| 1,761,260 | Gallasch | June 3, 1930 |
| 2,396,775 | De Young | Mar. 19, 1946 |
| 2,614,368 | Polk et al. | Oct. 21, 1952 |
| 2,648,171 | Hill | Aug. 11, 1953 |